United States Patent
Hayashi et al.

(10) Patent No.: US 6,231,661 B1
(45) Date of Patent: May 15, 2001

(54) FINE RED IRON OXIDE PIGMENT, AND PAINT OR RESIN COMPOSITION USING THE SAME

(75) Inventors: Kazuyuki Hayashi; Mineko Ohsugi; Hiroko Morii, all of Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/404,585

(22) Filed: Sep. 24, 1999

(30) Foreign Application Priority Data

Sep. 25, 1998 (JP) .................................................. 10-271478

(51) Int. Cl.⁷ ...................................................... C09C 1/22
(52) U.S. Cl. .......................... 106/456; 106/459; 423/632; 423/633
(58) Field of Search ................................... 106/456, 459; 423/632, 633

(56) References Cited

U.S. PATENT DOCUMENTS 5,750,250 * 5/1998 Hayshi et al. ........................ 428/328
5,994,611 * 11/1999 Nishihara et al. .................... 106/456
6,124,022 * 9/2000 Hayashi et al. ...................... 428/141

FOREIGN PATENT DOCUMENTS

| 2508932A1 | 9/1976 | (DE) . |
| 0853066A1 | 7/1998 | (EP) . |
| 0919522A1 | 6/1999 | (EP) . |
| 49-34498 | 3/1974 | (JP) . |
| 59-487868 | 11/1984 | (JP) . |

* cited by examiner

*Primary Examiner*—C. Melissa Koslow
*Assistant Examiner*—Veronica F. Faison
(74) *Attorney, Agent, or Firm*—Nixon & Vanderhye

(57) ABSTRACT

A fine red iron oxide pigment of the present invention comprises hematite particles and having a geometrical standard deviation of major axial diameter of not more than 1.5, a geometrical standard deviation of minor axial diameter of not more than 1.3 and an average major axial diameter of 0.005 to 0.1 $\mu$m. Such fine red iron oxide pigment is uniform in both major axial diameter and minor axial diameter thereof and exhibits an excellent transparency.

12 Claims, No Drawings

FINE RED IRON OXIDE PIGMENT, AND PAINT OR RESIN COMPOSITION USING THE SAME

BACKGROUND OF THE INVENTION

The present invention relates to a fine red iron oxide pigment and a paint or a resin composition using the fine red iron oxide pigment. More particularly, the present invention relates to a fine red iron oxide pigment which is uniform in both major axial diameter and minor axial diameter thereof and exhibits an excellent transparency, and a paint or a resin composition using the fine red iron oxide pigment, which also exhibits an excellent transparency.

Hematite particles have been widely known as a red iron oxide pigment, because these particles can exhibit a red color and have been used in many applications such as coloring of paints, printing inks, plastics, films, cosmetics or the like.

Among the hematite particles, by using those particles having a particle size of not more than 0.1 µm, the coating film obtained therefrom is transparent to visible light and, therefore, such particles are useful as a transparent red iron oxide pigment.

The red iron oxide pigment composed of fine hematite particles having a particle size of not more than 0.1 µm (hereinafter referred to merely as "fine red iron oxide pigment") are deteriorated in dispersibility in vehicles or resin composition due to the reduction of particle size thereof. Therefore, a coating film or a resin composition using the fine red iron oxide pigment is unsatisfactory in transparency.

Namely, the fine red iron oxide pigment has a high surface energy and tends to be agglomerated due to the reduction of particle size thereof, so that it is difficult to disperse the pigment in vehicles or resin compositions. Therefore, a coating film obtained from such an insufficient dispersion cannot show a sufficient transparency since the fine pigment is agglomerated into coarse particles.

Consequently, it has been demanded to improve not only the dispersibility of the fine red iron oxide pigment in vehicles or resin compositions but also the transparency of the pigment itself.

Hitherto, as the method of enhancing the dispersibility of the fine red iron oxide pigment, there has been known a method of improving a particle size thereof. As such a method, there has been already proposed a method of producing fine hematite particles having a uniform particle size by first producing fine goethite particles having a uniform particle size in an aqueous solution and then heat-dehydrating the obtained fine goethite particles while maintaining the uniform particle size of the fine goethite particles (Japanese Patent Application Laid-Open (KOKAI) No. 49-34498(1974), Japanese Patent Publication (KOKOKU) No. 59-48768(1984), etc.).

Especially, in Japanese Patent Application Laid-Open (KOKAI) No. 49-34498(1974), there are described (1) a process for producing a fine iron oxide pigment comprising spindle-shape particles having a uniform particle size, a ratio of a major axial diameter to a minor axial diameter of not more than 5:1 and an average particle diameter of 5 to 20 nm, which process comprises a first step of adding caustic alkali such as sodium hydroxide to a solution of a ferrous salt such as ferrous sulfate to obtain a ferrous hydroxide colloid solution at a temperature of from room temperature to 40° C.; a second step of reacting the obtained ferrous hydroxide with bicarbonate such as ammonium bicarbonate to obtain a ferrous carbonate colloid solution at a temperature of from room temperature to 40° C.; and a third step of passing an oxygen-containing gas such as air through said ferrous carbonate colloid solution at a temperature of from room temperature to 40° C. to transform said ferrous carbonate into ferric oxide hydroxide, and (2) a process for producing a fine iron oxide pigment, which process comprises (i) producing fine ferric oxide hydroxide comprising spindle-shape particles having a uniform particle size, a ratio of a major axial diameter to a minor axial diameter of not more than 5:1 and an average particle diameter of 5 to 20 nm by conducting a first step of adding caustic alkali such as sodium hydroxide to a solution of a ferrous salt such as ferrous sulfate to obtain a ferrous hydroxide colloid solution at a temperature of from room temperature to 40° C.; a second step of reacting the obtained ferrous hydroxide with bicarbonate such as ammonium bicarbonate to obtain a ferrous carbonate colloid solution at a temperature of from room temperature to 40° C.; and a third step of passing an oxygen-containing gas such as air through said ferrous carbonate colloid solution at a temperature of from room temperature to 40° C. to transform said ferrous carbonate into ferric oxide hydroxide, (ii) after subjecting said ferric oxide hydroxide as a precipitate to washing with water, filtering-out and drying, dehydrating said precipitate at a temperature of 250 to 350° C., thereby obtaining ferric oxide comprising spindle-shape particles which comprise primary particles having a particles diameter of about 5 nm, and have a uniform particle size and a ratio of a major axial diameter to a minor axial diameter of not more than 5:1.

In Japanese Patent Publication (KOKOKU) No. 59-48768 (1984), there are described (1) a process for producing an iron oxide pigment having a uniform particle size, which process comprises (i) stirring a ferrous carbonate suspension produced by adding an aqueous solution of a ferrous salt such as ferrous sulfate to an aqueous solution of carbonate such as sodium carbonate, for 2 to 4 hours under a non-oxidation condition, to obtain a fine colloid solution, and (ii) while adjusting a pH value of said ferrous carbonate colloid solution to 7 to 10, passing an oxygen-containing gas such as air through the solution to produce ferric oxide hydroxide, and (2) a process for producing an iron oxide pigment having a uniform particle size, which process comprises (i) producing a fine colloid solution by stirring a ferrous carbonate suspension produced by adding an aqueous solution of a ferrous salt such as ferrous sulfate to an aqueous solution of carbonate such as sodium carbonate, for 2 to 4 hours under a non-oxidation condition; (ii) while adjusting a pH value of said ferrous carbonate colloid solution to 7 to 10, passing an oxygen-containing gas such as air through the solution to produce a precipitate of ferric oxide hydroxide; and (iii) after washing with water, filtering-out and drying, dehydrating said precipitate of ferric oxide hydroxide at a temperature of 250 to 500° C.

At the present time, it has been most strongly demanded to provide a fine red iron oxide pigment having as uniform a particle size as possible in order to enhance the dispersibility thereof in vehicles or resin compositions. However, such fine red iron oxide pigment which is uniform in both major axial diameter and minor axial diameter thereof, cannot be obtained yet.

That is, in the above-mentioned known methods, as shown in Comparative Examples hereinafter, the fine goethite particles used as a starting material have failed to exhibit a sufficiently uniform particle size, especially a uniform minor axial diameter. Further, in the subsequent heat-dehydration process, the fine goethite particles tend to be sintered together due to the existence of ultrafine goethite particles mingled therein, so that the fine red iron oxide pigment obtained by the known methods has also failed to exhibit a uniform particle size, especially a uniform minor axial diameter.

On the other hand, in European Patent No. 919522 A, there have been proposed acicular hematite particles comprising a geometrical standard deviation of major axis diameter of not more than 1.50, a geometrical standard deviation of minor axis diameter of not more than 1.35, a BET specific surface area of 35.9 to 150 m$^2$/g and an average major axis diameter of 0.004 to 0.295 µm; and acicular hematite particles comprising a geometrical standard deviation of major axis diameter of not more than 1.50, a geometrical standard deviation of minor axis diameter of not more than 1.35, a BET specific surface area of 35.9 to 150 m$^2$/g and an average major axis diameter of 0.004 to 0.295 µm. and containing aluminum within the particle in an amount of 0.05 to 50% by weight (calculated as Al) based on the weight of the acicular hematite particles.

As a result of the present inventors' earnest studies, it has been found that in advance of a heat-dehydrating treatment of fine goethite particles at a temperature of 250 to 500° C. to transform the fine goethite particles into fine hematite particles, by heat-treating the fine goethite particles at a temperature of 100 to 200° C. to make the fine goethite particles absorb ultrafine goethite particles, the obtained hematite particles having a geometrical standard deviation of major axial diameter of not more than 1.5, a geometrical standard deviation of minor axial diameter of not more than 1.3 and an average major axial diameter of 0.005 to 0.1 µm are useful as a fine red iron oxide pigment which is excellent in transparency, and a paint or a resin composition obtained by using the fine red iron oxide pigment can also show an excellent transparency. The present invention has been attained on the basis of the finding.

SUMMARY OF THE INVENTION

It is an object of the present invention to provide a fine red iron oxide pigment which is uniform in both major axial diameter and minor axial diameter thereof, and exhibits an excellent transparency.

It is another object of the present invention to provide a paint or a resin composition containing the fine red iron oxide pigment, which is excellent in transparency.

To accomplish the aims, in a first aspect of the present invention, there is provided a fine red iron oxide pigment comprising hematite particles, and having a geometrical standard deviation of major axial diameter of not more than 1.5, a geometrical standard deviation of minor axial diameter of not more than 1.3 and an average major axial diameter of 0.005 to 0.1 µm.

In a second aspect of the present invention, there is provided a fine red iron oxide pigment comprising hematite particles which contain aluminum inside of each particle of said pigment in an amount of 0.05 to 50% by weight, calculated as Al, based on the weight of said pigment, and having a geometrical standard deviation of major axial diameter of not more than 1.5, a geometrical standard deviation of minor axial diameter of not more than 1.3 and an average major axial diameter of 0.005 to 0.1 µm.

In a third aspect of the present invention, there is provided a fine red iron oxide pigment comprising hematite particles which have at least one surface-coating material selected from the group consisting of a hydroxide of aluminum, an oxide of aluminum, a hydroxide of silicon and an oxide of silicon, on at least a part of the surface of each said pigment particle, and having a geometrical standard deviation of major axial diameter of not more than 1.5, a geometrical standard deviation of minor axial diameter of not more than 1.3 and an average major axial diameter of 0.005 to 0.1 µm.

In a fourth aspect of the present invention, there is provided a process for producing a fine red iron oxide pigment, comprising:

(i) heat-treating fine goethite particles at a temperature of 100 to 200° C. to allow ultrafine goethite particles to be absorbed into said fine goethite particles; and (ii) then heat-dehydrating said fine goethite particles at a temperature of 250 to 500° C. to transform said fine goethite particles into fine hematite particles.

In a fifth aspect of the present invention, there is provided a process for producing a fine red iron oxide pigment, comprising:

(i) heat-treating fine goethite particles containing aluminum inside thereof in an amount of 0.05 to 50% by weight, calculated as Al, based on the weight of the fine goethite particles, at a temperature of 100 to 200° C. to allow ultrafine goethite particles to be absorbed into said fine goethite particles; and (ii) then heat-dehydrating said fine goethite particles at a temperature of 250 to 500° C. to transform said fine goethite particles into fine hematite particles.

In a sixth aspect of the present invention, there is provided a process for producing a fine red iron oxide pigment, comprising:

(i) heat-treating fine goethite particles at a temperature of 100 to 200° C. to allow ultrafine goethite particles to be absorbed into said fine goethite particles;

(ii) then heat-dehydrating said fine goethite particles at a temperature of 250 to 500° C. to transform said fine goethite particles into fine hematite particles; and (iii) treating the thus-obtained fine hematite particles with an aqueous solution containing an aluminum compound, a silicon compound or both an aluminum compound and a silicon compound, thereby coating the surfaces of the said hematite particles with an aluminum oxide, a silicon oxide, an aluminum hydroxide, a silicon hydroxide, or a mixture thereof.

In a seventh aspect of the present invention, there is provided a paint comprising a paint base material and the fine red iron oxide pigment as set forth in any one of the first to third aspects.

In an eighth aspect of the present invention, there is provided a rubber or resin composition comprising a rubber or resin base material and the fine red iron oxide pigment as set forth in any one of the first to third aspects.

DETAILED DESCRIPTION OF THE INVENTION

The present invention will now be described in detail below.

First, the fine red iron oxide pigment according to the present invention is explained.

The fine red iron oxide pigment according to the present invention, comprises fine hematite particles having a geometrical standard deviation of major axial diameter of not more than 1.5, a geometrical standard deviation of minor axial diameter of not more than 1.3 and an average major axial diameter of 0.005 to 0.1 µm.

When the geometrical standard deviation value of major axial diameter exceeds 1.5 and the geometrical standard deviation value of minor axial diameter exceeds 1.3, it may become difficult to uniformly disperse the fine red iron oxide pigment in vehicles or resin compositions because coarse particles are present in the dispersion. As a result, a coating film and a resin composition obtained by using the pigment may fail to show a sufficient transparency. In the consideration of the dispersibility in vehicles or resin compositions and the transparency of the obtained coating film or resin compositions, the geometrical standard deviation value of major axial diameter is preferably not more than 1.48, more preferably not more than 1.43, and the geometrical standard deviation value of minor axial diameter is preferably not more than 1.28, more preferably not more than 1.25. Under the consideration of the industrial productivity, the lower limit of the geometrical standard deviation value of major axial diameter and geometrical standard deviation value of minor axial diameter are 1.01, respectively.

When the average major axial diameter of the fine red iron oxide pigment particles is less than 0.005 µm, since an intermolecular force between the particles is increased due to the reduction of particle size thereof, it may become difficult to uniformly disperse the pigment in vehicles or resin compositions. As a result, a coating film or a resin composition obtained by using the fine red iron oxide pigment may fail to show a sufficient transparency. On the other hand, when the average major axial diameter is more than 0.1 µm, although the dispersibility in vehicles or resin compositions is good, the pigment particles may be too coarse, so that a tinting strength of the pigment may be considerably increased. As a result, the coating film or the resin composition obtained by using the pigment no longer may show a sufficient transparency.

In the consideration of the dispersibility in vehicles or resin compositions and the transparency of the obtained coating film or resin composition, the average major axial diameter of the fine red iron oxide pigment according to the present invention, is preferably 0.01 to 0.09 µm, more preferably 0.01 to 0.08 µm.

The average minor axial diameter of the fine red iron oxide pigment particles according to the present invention is preferably 0.0025 to 0.05 µm, more preferably 0.005 to 0.045 µm, still more preferably 0.05 to 0.04 µm.

When the average minor axial diameter of the fine red iron oxide pigment particles is less than 0.0025 µm, since an intermolecular force between the particles is increased due to the reduction of particle size thereof, it may become difficult to uniformly disperse the pigment in vehicles or resin compositions. As a result, a coating film or a resin composition obtained by using the fine red iron oxide pigment may fail to show a sufficient transparency.

The fine red iron oxide pigment according to the present invention, further has an aspect ratio (average major axial diameter/average minor axial diameter) of preferably not more than 20:1, more preferably not more than 15:1, still more preferably not more than 10:1; and a BET specific surface area of preferably 40 to 250 m²/g, more preferably 50 to 220 m²/g, still more preferably 70 to 200 m²/g. The lower limit of the aspect ratio is preferably 2:1.

When the aspect ratio is more than 20:1, the pigment particles may be entangled or intertwined with each other, so that the dispersibility of the pigment in vehicles or resin compositions tends to be deteriorated and the viscosity of the pigment tends to be increased. As a result, the obtained coating film or resin composition may fail to show a sufficient transparency.

When the BET specific surface area of the fine red iron oxide pigment particles is more than 250 m²/g, since an intermolecular force between the particles is increased due to the reduction of particle size thereof, it becomes difficult to uniformly disperse the pigment in vehicles or resin compositions. As a result, a coating film or a resin composition obtained by using the fine red iron oxide pigment may fail to show a sufficient transparency. On the other hand, when the BET specific surface area is less than 40 m²/g, the pigment particles are too coarse. As a result, the coating film or the resin composition obtained by using the pigment no longer shows a sufficient transparency.

The fine red iron oxide pigment particle according to the present invention may contain aluminum inside of each particle in an amount of 0.05 to 50% by weight (calculated as Al). The aluminum-containing fine red iron oxide pigment are more excellent in transparency of particles themselves, as compared to those containing no aluminum inside thereof, and a resin composition obtained by using such an aluminum-containing fine red iron oxide pigment can exhibit an improved aging resistance.

When the amount of aluminum contained inside of each pigment particle is less than 0.05% by weight based on the weight of the fine red iron oxide pigment, the effects of improving the transparency and the aging resistance may not be obtained. On the other hand, when the amount of aluminum contained inside is more than 50% by weight, the obtained fine red iron oxide pigment can show a sufficient transparency and a sufficient aging resistance. However, since the aimed effects of the present invention are already saturated, the use of such a large amount of aluminum is unnecessary and meaningless. In the consideration of the above effects of improving the transparency and the aging resistance of the obtained fine red iron oxide pigment as well as the productivity thereof, the amount of aluminum contained inside of each particle of the fine red iron oxide pigment is preferably 0.1 to 40% by weight (calculated as Al) based on the weight of the fine red iron oxide pigment.

It is preferred that the aluminum contained inside of the fine red iron oxide pigment, be substantially homogeneously distributed from a central portion to a surface of each pigment particle.

The fine red iron oxide pigment particles containing aluminum inside thereof according to the present invention, may be substantially the same in particle size, geometrical standard deviation of major axis diameter, geometrical standard deviation of minor axis diameter, aspect ratio and BET specific surface area as those of the fine red iron oxide pigment containing no aluminum inside thereof according to the present invention.

At least a part of the surface of the fine red iron oxide pigment particle according to the present invention, may be coated with at least one surface-coating material selected from the group consisting of a hydroxide of aluminum, an oxide of aluminum, a hydroxide of silicon and an oxide of silicon. The fine red iron oxide pigment particle coated with the surface-coating material, can be further enhanced in dispersibility in vehicles or resin compositions as compared to that of the fine red iron oxide pigment which is not coated with the surface-coating material. In addition, the resin composition obtained by using such a fine red iron oxide pigment coated with the surface-coating material is more excellent in aging resistance, as compared to that of the resin composition obtained by using the fine red iron oxide pigment which is not coated with the surface-coating material.

The amount of the surface-coating material on the surface of the fine red iron oxide pigment particle is preferably 0.01 to 20% by weight (calculated as Al, SiO$_2$ or both Al and SiO$_2$) based on the weight of the fine red iron oxide pigment. When the amount of the surface-coating material is less than 0.01% by weight, the effects of improving the dispersibility and the aging resistance may not be obtained. On the other hand, when the amount of the surface-coating material is more than 20% by weight, although sufficient effects of improving the dispersibility and the aging resistance can be obtained, the effects are already saturated and, therefore, the use of such a large amount of the surface-coating material is unnecessary and meaningless. In the consideration of the effects of improving the dispersibility of the obtained fine red iron oxide pigment and the aging resistance of the resin composition obtained by using such a pigment as well as the productivity of the fine red iron oxide pigment, the amount of the surface-coating material is more preferably 0.05 to 15% by weight (calculated as Al, SiO$_2$ or both Al and SiO$_2$) based on the weight of the fine red iron oxide pigment.

The fine red iron oxide pigment particles coated with the surface-coating material according to the present invention, are substantially the same in particle size, geometrical standard deviation of major axis diameter, geometrical standard deviation of minor axis diameter, aspect ratio and BET specific surface area, as those of the fine red iron oxide pigment according to the present invention which are not coated with the surface-coating material.

Next, the process for producing the fine red iron oxide pigment particles according to the present invention is described.

That is, fine goethite particles produced by passing an oxygen-containing gas such as air through a suspension containing an iron-containing precipitate obtained by reacting a ferrous salt with either an aqueous alkali hydroxide solution, an aqueous alkali carbonate solution, or an aqueous alkali hydroxide and alkali carbonate solution, are previously heat-treated at a temperature of usually 100 to 200° C., and then are heat-dehydrated at a temperature of usually 250 to 500° C., thereby producing the fine red iron oxide pigment.

The fine goethite particles used as a starting material in the present invention, usually have a geometrical standard deviation of major axial diameter of usually not more than 1.8, a geometrical standard deviation of minor axial diameter of usually not more than 1.7, an average major axial diameter of usually 0.005 to 0.1 μm and an average minor axial diameter of usually 0.0025 to 0.05 μm.

When the heat-treating temperature is less than 100° C., it may be difficult to make the fine goethite particles sufficiently absorb ultrafine goethite particles (average particle size: usually not more than 0.001 μm), especially it may be difficult to obtain particles having a uniform minor axial diameter. On the other hand, when the heat-treating temperature is more than 200° C., the dehydration of the fine goethite particles is initiated even under such a condition that the ultrafine goethite particles are still remains therein. For this reason, the sintering between particles tend to be caused, so that it may be difficult to obtain particles having a uniform particle size, especially a uniform minor axial diameter. The heat-treating temperature is preferably in the range of 120 to 200° C.

The heat-treating time is preferably 5 to 60 minutes.

The fine goethite particles obtained by heat-treating at a temperature of usually 100 to 200° C., can show a geometrical standard deviation of major axial diameter of usually not more than 1.5, a geometrical standard deviation of minor axial diameter of usually not more than 1.3, an average major axial diameter of usually 0.005 to 0.1 pm and an average minor axial diameter of usually 0.0025 to 0.05 pm.

When the heat-dehydrating temperature is less than 250° C., the dehydration reaction may require a long period of time. On the other hand, when the heat-dehydrating temperature is more than 500° C., the dehydration reaction too rapidly proceeds, so that the obtained particles tend to show a broken or inappropriate particle shape, or the sintering between particles tends to be caused.

Meanwhile, the fine red iron oxide pigment containing aluminum inside thereof according to the present invention may be produced as follows. That is, in the production reaction of the fine goethite particles, an aluminum compound is caused to exist in the reaction system in advance of passing the oxygen-containing gas such as air therethrough, thereby obtaining fine goethite particles containing aluminum inside thereof in a substantially homogeneous state. Successively, the thus obtained fine goethite particles homogeneously containing aluminum inside thereof are heat-treated at a temperature of usually 100 to 200° C. and then heat-dehydrated at a temperature of usually 250 to 500° C., thereby producing the aimed fine red iron oxide pigment containing aluminum inside thereof.

The aluminum compound may be added to either the aqueous ferrous salt solution, any of the aqueous alkali solutions, or the water suspension containing the iron-containing precipitate before passing the oxygen-containing gas such as air therethrough. Among them, it is preferred that the aluminum compound be added to the aqueous ferrous salt solution.

As the aluminum compounds added, there may be exemplified alkali aluminates such as sodium aluminate; aluminum salts such as aluminum sulfate, aluminum chloride, aluminum acetate, aluminum nitrate, or the like.

The amount of the aluminum compound added is preferably 0.5 to 350 mol % (calculated as Al) based on Fe contained in the aqueous ferrous salt solution. When the amount of the aluminum compound added is less than 0.5 mol %, the aimed effects of the present invention, i.e., the effects of improving the transparency and the aging resistance may not be obtained. On the other hand, when the amount of the aluminum compound added is more than 350 mol %, the aimed effects of the present invention are already almost saturated and, therefore, the addition of such a large amount of the aluminum compound is unnecessary and meaningless.

In accordance with the present invention, as described above, at least a part of the surface of the fine red iron oxide pigment particle may be coated with at least one surface-coating material selected from the group consisting of a hydroxide of aluminum, an oxide of aluminum, a hydroxide of silicon and an oxide of silicon.

In this case, the amount of an aluminum compound added is usually 0.01 to 20% by weight (calculated as Al) based on the weight of the fine red iron oxide pigment. When the amount of the aluminum compound added is less than 0.01% by weight, it may be difficult to coat the surface of the fine red iron oxide pigment with the hydroxide of aluminum or oxide of aluminum in an amount sufficient to obtain the effects of improving the dispersibility and the aging resistance. On the other hand, when the amount of the aluminum compound added is more than 20% by weight, since the coating effects are already saturated, it is unnecessary and meaningless to add such a large amount of the aluminum compound.

The amount of a silicon compound added is usually 0.01 to 20% by weight (calculated as SiO$_2$) based on the weight of the fine red iron oxide pigment. When the amount of the silicon compound added is less than 0.01% by weight, it may be difficult to cover the surface of the fine red iron oxide pigment with the hydroxide of silicon or oxide of silicon in an amount sufficient to obtain the effects of improving the dispersibility and the aging resistance. On the other hand, when the amount of the silicon compound added is more than 20% by weight, since the coating effects are already saturated, it is unnecessary and meaningless to add such a large amount of the silicon compound.

In the case where both the aluminum compound and the silicon compound are used, the total amount of these compounds added is preferably 0.01 to 20% by weight (calculated as Al and $SiO_2$) based on the weight of the fine red iron oxide pigment.

Next, the paint using the fine red iron oxide pigment according to the present invention, will now be described in detail.

The solvent-based paint using the fine red iron oxide pigment according to the present invention, has a gloss of usually not less than 80%, preferably not less than 85%, still more preferably 90 to 150%, when formed into a coating film. As to the transparency of the coating film, the linear absorption thereof is usually not more than 0.1 $\mu m^{-1}$, preferably not more than 0.09 $\mu m^{-1}$, still more preferably 0.01 to 0.085 $\mu m^{-1}$.

The water-based paint using the fine red iron oxide pigment according to the present invention, has a gloss of usually not less than 75%, preferably not less than 80%, still more preferably 85 to 150%, when formed into a coating film. As to the transparency of the coating film, the linear absorption thereof is usually not more than 0.15 $\mu m^{-1}$, preferably not more than 0.1 $\mu m^{-1}$, still more preferably 0.01 to 0.09 $\mu m^{-1}$.

As to the blending ratio of the fine red iron oxide pigment according to the present invention to a paint base material, the fine red iron oxide pigment may be used in an amount of usually 0.5 to 100 parts by weight based on 100 parts by weight of the paint base material. In the consideration of handling property of the paint, the amount of the fine red iron oxide pigment blended is preferably 1.0 to 80 parts by weight, more preferably 1.0 to 50 parts by weight based on 100 parts by weight of the paint base material.

The paint base material is composed of a resin and a solvent, and may further contain, a defoamer, an extender pigment, a drying agent, a surfactant, a hardner, an auxiliary agent and the like.

Examples of the resins may include those ordinarily used for solvent-based paints such as acrylic resins, alkyd resins, polyester resins, polyurethane resins, epoxy resins, phenol resins, melamine resins, amino resins or the like.

Examples of the resins may include those ordinarily used for water-based paints such as water-soluble alkyd resins, water-soluble melamine resins, water-soluble acrylic resins, water-soluble urethane resins, water-soluble epoxy resins, acrylic emulsion resin, urethane emulsion resins, acrylic styrene emulsion resins, epoxy emulsion resins, vinyl acetate emulsion resins or the like.

Examples of the solvents may include those ordinarily used for solvent-based paints such as toluene, xylene, butyl acetate, methyl acetate, methyl isobutyl ketone, butyl cellosolve, ethyl cellosolve, butyl alcohol, aliphatic hydrocarbons or the like.

Examples of the solvents may include those ordinarily used for water-based paints water and butyl cellosolve, ethyl cellosolve, propylene glycol monomethyl ether, methyl cellosolve acetate, butoxyethyl acetate, ethoxyethanol, hexoxyethanol, methyl ethyl ketone, phenyl glycol ether, ethanol, butyl alcohol, butoxyethanol, propanol, propoxypropanol or the like.

As the defoamers, there may be used commercially available products such as NOPCO 8034 (tradename), SN-DEFOAMER 477 (tradename), SN-DEFOAMER 5013 (tradename), SN-DEFOAMER 382 (tradename) or SN-DEFOAMER 247 (tradename) (all produced by San-Nopco Co., Ltd.); ANTIFOAM 08 (tradename) or EMULGEN 903 (tradename) (all produced by Kao Co., Ltd.); or the like.

The paint according to the present invention can be produced by blending the fine red iron oxide pigment according to the present invention and the above-mentioned paint base material in specific weight ratios by a commonly used mixer such as ball mill, roll mill, homomixer, shaker, attritor or sand grinder.

Next, the resin composition using the fine red iron oxide pigment according to the present invention, is described.

As to the transparency of the resin composition using the fine red iron oxide pigment according to the present invention, the linear absorption thereof is usually not more than 0.15 $\mu m^{-1}$, preferably not more than 0.10 $\mu m_{-1}$, more preferably 0.03 to 0.095 $\mu m^{-1}$. In addition, the resin composition has a dispersing condition of usually not less than 3, preferably not less than 4, more preferably 5 when evaluated by such a method as defined in Examples hereinafter.

Further, the resin composition using the fine red iron oxide pigment particles containing aluminum inside thereof and the fine red iron oxide pigment particles whose at least a part of the particle surface is coated with the surface-coating material according to the present invention, can exhibit such a transparency that the linear absorption thereof is usually not more than 0.1 $\mu m^{-1}$, preferably not more than 0.095 $\mu m^{-1}$, more preferably 0.03 to 0.093 $\mu m^{-1}$ and a dispersion condition of not less than 4, preferably 5, when evaluated by such a method as defined in Examples hereinafter.

In addition, as to the aging resistance, the resin composition using the fine red iron oxide pigment particles according to the present invention, shows $S_A$ (%) (=$S/S_0 \times 100$; a percentage of discolored area (S) to total area ($S_0$) of colored resin plate, when evaluated by such a method as defined in Examples hereinafter) of usually more than 10% when heated for 10 minutes. Whereas, the aging resistance of the resin composition using the fine red iron oxide pigment particles containing aluminum inside thereof and the fine red iron oxide pigment particles whose at least a part of the particle surface is coated with the surface-coating material according to the present invention, can be increased up $S_A$ (%) (=$S/S_0=100$; a percentage of discolored area (S) to total area ($S_0$) of colored resin plate, when evaluated by such a method as defined in Examples hereinafter) of usually not more than 10% even after heated for 90 minutes.

The amount of the fine red iron oxide pigment blended in the resin composition according to the present invention is usually 0.01 to 50 parts by weight based on 100 parts by weight of resins. In the consideration of handling property of the resin composition, the amount of the fine red iron oxide pigment blended is preferably 0.05 to 45 parts by weight, more preferably 0.1 to 40 parts by weight based on 100 parts by weight of resins.

As the resins used in the resin composition, there may be exemplified natural rubbers, synthetic rubbers, thermoplastic resins such as polyvinyl chloride, polyolefins such as polyethylene, polypropylene or the like, styrene polymers, polyamides, or the like. The resin composition may contain, additives such as a lubricant, a plasticizer, an anti-oxidizing agent, an ultraviolet light absorber or various other stabilizers.

The additives may be added in an amount of usually not more than 50% by weight based on the total weight of the fine red iron oxide pigment and the resins. When the amount of the additives added is more than 50% by weight, the resin composition is deteriorated in moldability.

The resin composition according to the present invention may be produced by intimately mixing a resin and the fine red iron oxide pigment together in advance and then applying-a strong shear force to the resultant mixture by a kneader or an extruder while heating, in order to deaggregate aggregates of the fine red iron oxide pigment and uniformly disperse the fine red iron oxide pigment in the resin composition. The thus obtained resin composition may be formed into an appropriate shape upon use according to the applications thereof.

The feature of the present invention lies in such a fact that when fine goethite particles are previously heat-treated at a temperature of usually 100 to 200° C., it is possible to obtain fine goethite particles having not only a uniform major axial diameter but also a uniform minor axial diameter.

The reason why the fine red iron oxide pigment having a uniform particle size can be obtained according to the present invention, is considered as follows. That is, since ultrafine goethite particles are absorbed into the fine goethite particles, the amount of ultrafine goethite particles is considerably reduced. Further, since the obtained fine goethite particles show not only a uniform major axial diameter but also a uniform minor axial diameter as well as less content of ultrafine goethite particles, the sintering between the particles during the subsequent heat-dehydration treatment due to the existence of ultrafine goethite particles can be effectively prevented. As a result, it is possible to obtain fine hematite particles which can sufficiently retain or inherit the uniform particle size of the fine goethite particles.

The fine red iron oxide pigment composed of fine hematite particles having a geometrical standard deviation of major axial diameter of usually not more than 1.5 and a geometrical standard deviation of minor axial diameter usually of not more than 1.3, can show not only a uniform major axial diameter but also a uniform minor axial diameter, resulting in enhancement of dispersibility in vehicles or resin compositions. Further, the coating film and the resin composition obtained by using such a fine red iron oxide pigment are excellent in dispersibility and transparency.

The reason why the fine red iron oxide pigment according to the present invention can show an improved dispersibility, is considered as follows. That is, since the obtained fine hematite particles having a geometrical standard deviation of major axial diameter of usually not more than 1.5 and a geometrical standard deviation of minor axial diameter of usually not more than 1.3, are uniform particles containing less amounts of coarse particles and ultrafine particles, it is considered that the fine red iron oxide pigment composed of such fine hematite particles can show an improved dispersibility in vehicles or resin compositions.

The reason why the paint and the resin composition obtained by using the fine red iron oxide pigment according to the present invention can show an improved transparency, is considered as follows. That is, the fine red iron oxide pigment can show an excellent dispersibility in vehicles or resin compositions since the pigment is composed of particles having an excellent dispersibility. For this reason, it is considered that the coating film or the resin composition obtained by using the fine red iron oxide pigment is free from aggregated particles and coarse particles.

The reason why the resin composition obtained by using the fine red iron oxide pigment containing aluminum inside of each pigment particle according to the present invention can show an excellent aging resistance, is considered as follows. That is, the catalytic effect of hematite particles by which the resin composition tends to be aged or deteriorated, can be suppressed by the aluminum contained inside of each pigment particle. Further, since the fine red iron oxide pigment containing aluminum inside of each particle thereof is highly dispersed and mixed in the resin composition due to the excellent dispersibility thereof, the pigment can exhibit an excellent light- or heat-insulating effect. For this reason, the obtained resin composition can be effectively prevented from being adversely affected by light or heat.

The fine red iron oxide pigment according to the present invention, has not only a uniform major axial diameter but also a uniform minor axial diameter and, therefore, are excellent in transparency. Accordingly, the fine red iron oxide pigment according to the present invention is suitable as a transparent red pigment.

Further, the paint or the resin composition obtained by using the fine red iron oxide pigment according to the present invention can also show an excellent transparency due to the uniformity in particle size and the excellent transparency of the pigment.

EXAMPLES

The present invention will now be described in more detail with reference to the following examples and comparative examples, but the present invention is not restricted to those examples and various modifications are possible within the scope of the invention.

The properties in the examples were measured by the following methods.

(1) The average major axial diameter and average minor axial diameter of particles are respectively expressed by the average values obtained by measuring major axial diameters and minor axial diameters of about 350 particles which were sampled from a micrograph obtained by magnifying an electron micrograph (×30,000) four times in each of the longitudinal and transverse directions.

(2) The aspect ratio of particles is a ratio of the average major axial diameter to the average minor axial diameter thereof.

(3) The geometrical standard deviation values of major axial diameter and minor axial diameter of particles are respectively expressed by the values obtained by the following method. That is, the major axial diameter and minor axial diameter of the particles were respectively measured from the above magnified electron micrograph. The actual major axial diameter and minor axial diameter and the number of the particles were respectively calculated from the measured values. On a logarithmic normal probability paper, the major axial diameter and minor axial diameter were respectively plotted at regular intervals on the abscissa-axis and the accumulative number (under integration sieve) of particles belonging to each interval of the major axial diameter and minor axial diameter were respectively plotted by percentage on the ordinate-axis by a statistical technique. The values of the major axial diameter and minor axial diameter corresponding to the accumulative number of particles of 50% and 84.13%, respectively, were read from the graph, and the geometrical standard deviation was calculated from the following formula:

Geometrical standard deviation=
{major axial diameter or minor axial diameter corresponding to 84.13% under integration sieve}/{major axial diameter or minor axial diameter (geometrical average diameter) corresponding to 50% under integration sieve}

The closer to 1 the geometrical standard deviation value, the more excellent the particle size distribution of the particles.

(4) The specific surface area is expressed by the value measured by a BET method.

(5) The amounts of Al and Si contained in particles were measured by a fluorescent X-ray spectroscopy device "3063M Model" (manufactured by Rigaku Denki Kogyo Co., Ltd.) according to JIS K0119 "General rule of fluorescent X-ray analysis".

(6) The transparency of a coating film or a resin composition using the fine red iron oxide pigment, is expressed by a linear absorption coefficient calculated from a measured light transmittance of a coating film obtained by coating a 100 gm-thick clear base film with a paint prepared by the method described hereinafter, or a measured light transmittance of a resin plate having the below-mentioned composition, according to the following formula. The respective light transmittances were measured by a self-recording photoelectric spectrophotometer "IIU-2100" (manufactured by Simazu Seisakusho Co., Ltd.).

Linear absorption coefficient $(\mu m^{-1})=\ln(1/t)/FT$ wherein t represents a light transmittance (–) at $\lambda=900$ nm.

The smaller the linear absorption coefficient, the more easily the light transmits through the coating film or the resin composition, i.e., the higher the transparency.

(7) The aging resistance ($S_A(\%)$) is determined by the following method. That is, a colored resin plate (1.5 cm in length×1.5 cm in width×1 mm in thickness) having the below-mentioned composition in which the fine red iron oxide pigment was kneaded, was heated at 190° C., and the $S_A(\%)$ was obtained at intervals of 5% from the following formula.

$$S_A(\%)=(S/S_0)\times 100$$

Wherein S represents an area where the resin was discolored and deteriorated after heating, $S_0$ represents a whole area (1.5 cm×1.5 cm=2.25 cm²) of the colored resin plate before heating.

Namely, the condition that the $S_A(\%)$ is 0%, denotes that the colored resin plate suffers from no deterioration, while the condition that the $S_A(\%)$ is 100%, denotes that the colored resin plate is completely deteriorated.

(8) The dispersibility in vehicle was determined by measuring the gloss on a coating surface of a coating film obtained by using a paint prepared by the below-mentioned method.

More specifically, the gloss was obtained by measuring the 20° C. gloss using a glossmeter UGV-5D (manufactured by Suga Shikenki Co., Ltd.). The higher the gloss, the more excellent the dispersibility of the fine red iron oxide pigment particles in vehicle.

(9) The paint viscosity is expressed by the value obtained by measuring the viscosity (at 25° C.) of a paint preparing by the below-mentioned method, at a shear rate (D) of 1.92 $\sec^{-1}$ using an E-type viscometer (cone plate-type viscometer) EMD-R (manufactured by Tokyo Keiki Co., Ltd.).

(10) The dispersibility in resin composition was evaluated by visually counting the number of undispersed aggregate particles on the surface of the obtained resin composition, and classifying the results into the following five ranks. The 5th rank represents the most excellent dispersing condition.

Rank 5: No undispersed aggregate particles were recognized;

Rank 4: 4 undispersed aggregate particles per 1 cm² were recognized;

Rank 3: 9 undispersed aggregate particles per 1 cm² were recognized;

Rank 2: 10 to 49 unidispersed aggregate particles per 1 cm² were recognized; and Rank 1: not less than 50 undispersed aggregate particles per 1 cm² were recognized.

Example 1

<Production of Fine Red Iron Oxide Pigment>

A slurry of acicular fine goethite particles obtained by using an aqueous ferrous sulfate solution and an aqueous sodium carbonate solution, was filtered using a filter press, and then the obtained filter cake was sufficiently washed with water while passing water therethrough.

The obtained wet cake was dried at 120° C. for 24 hours, and then pulverized by a free crusher (M-2 model, manufactured by Nara KikeLi Seisakusho Co., Ltd.), thereby obtaining fine goethite particles. The obtained fine goethite particles had an average major axial diameter of 0.0688 μm, a geometrical standard deviation value of major axial diameter of 1.33, an average minor axial diameter of 0.0101 μm, a geometrical standard deviation value of minor axial diameter of 1.28, an aspect ratio of 6.8:1 and a BET specific surface area value of 165.3 m²/g.

The obtained fine goethite particles were charged into a metallic heat-treatment furnace, and heat-treated therein at 150° C. for 30 minutes, thereby allowing ultrafine goethite particles to be absorbed into the fine goethite particles.

Successively, the obtained fine goethite particles were charged again into the metallic heat-treatment furnace, and then heat-dehydrated therein at 340° C. for 30 minutes, thereby obtaining a fine red iron oxide pigment. The obtained fine red iron oxide pigment had an average major axial diameter of 0.0620 μm, a geometrical standard deviation value of major axial diameter of 1.33, an average minor axial diameter of 0.0108 μm, a geometrical standard deviation value of minor axial diameter of 1.15, an aspect ratio of 5.7:1 and a BET specific surface area value of 143.8 m²/g.

Example 2

<Production of Solvent-Based Paint Using Fine Red Iron Oxide Pigment>

5.0 g of the fine red iron oxide pigment obtained in Example 1, and other paint components shown below were charged into a 250-ml glass bottle. These components were intimately mixed and dispersed together with 160 g of 3 mmφ glass beads by a paint shaker for 120 minutes, thereby preparing a mill base.

Composition of Solvent-Based Paint:

| | |
|---|---|
| Fine red iron oxide pigment | 9.9 parts by weight |
| Melamine resin (SUPER-PECKAMINE J-820-60 (tradename) produced by Dai-Nippon Ink Kagaku Kogyo Co., Ltd.) | 19.8 parts by weight |
| Alkyd resin (BEKKOSOL 1307-60EL | 39.6 parts by weight |

-continued

| | |
|---|---|
| (tradename) produced by Dai-Nippon Ink Kagaku Kogyo Co., Ltd.) | |
| Xylene | 29.7 parts by weight |
| Butanol | 1.0 part by weight |

The viscosity of the obtained solvent-based paint was 2,304 cP.

The thus obtained paint was applied onto a transparent glass plate (having a size of 0.8 mm (thickness)×70 mm (width)×150 mm (length)) and then dried, thereby obtaining a coating film thereon. The obtained coating film had a gloss of 93% and a linear absorption of 0.0528 $\mu m^{-1}$.

Examples 3
<Production of Water-Based Paint Using Fine Red Iron Oxide Pigment>

5.0 g of the fine red iron oxide pigment particles obtained in Example 1 were mixed with a water-soluble alkyd resin, etc., at the below-specified ratio. The mixture was added along with 160 g of 3 mmφ glass beads into a 250-ml glass bottle, and intimately mixed and dispersed together with by a paint shaker for 90 minutes, thereby producing a mill base.
Composition of Mill Base:

| | |
|---|---|
| Fine red iron oxide pigment particles | 9.9 parts by weight |
| Water-soluble alkyd resin (Tradename: S-118 produced by Dai-Nippon Ink Kagaku Co., Ltd.) | 19.8 parts by weight |
| Defoamer (Tradename: NOPCO 8034 produced by San-Nopco Co., Ltd.) | 0.5 part by weight |
| Water | 7.3 parts by weight |
| Butyl Cellosolve | 6.2 parts by weight |

The thus obtained mill base and other components shown below were blended together at the below-specified ratio, and further intimately mixed and dispersed together by a paint shaker for 15 minutes, thereby producing a water-based paint.
Composition of Water-Based Paint:

| | |
|---|---|
| Mill base | 43.7 parts by weight |
| Water-soluble alkyd resin (Tradename: S-118 produced by Dai-Nippon Ink Kagaku Co., Ltd.) | 28.6 parts by weight |
| Water-soluble melamine resin (Tradename: S-695 produced by Dai-Nippon Ink Kagaku Co., Ltd.) | 11.0 parts by weight |
| Defoamer (Tradename: NOPCO 8034 produced by San-Nopco Co., Ltd.) | 0.5 part by weight |
| Water | 13.8 parts by weight |
| Butyl Cellosolve | 2.4 parts by weight |

The thus obtained water-based paint had a viscosity of 2,048 cP.

Next, the water-based paint was applied onto a transparent glass plate (having a size of 0.8 mm×70 mm×150 mm) and then dried, thereby obtaining a coating film thereon. The obtained coating film had a gloss of 88% and a linear absorption of 0.0852 $\mu m^{-1}$.

Example 4
<Production of Resin Composition Using Red Iron Oxide Pigment>

0.5 g of the fine red iron oxide pigment obtained in Example 1 and 49.5 g of polyvinyl chloride resin particles (103EP8D (tradename), produced by Nippon Zeon Co., Ltd.) were weighed, charged into a 100 ml beaker and intimately mixed together by a spatula, thereby obtaining mixed particles.

The thus obtained mixed particles were mixed with 1.0 g of calcium stearate. The mixture was then gradually fed to hot rolls which were heated at 160° C. and whose clearance was set to 0.2 mm, and continuously kneaded together until a uniform resin composition was obtained. Thereafter, the obtained resin composition was separated from the hot rolls, and used as a raw material for a colored resin plate.

Successively, the resin composition was interposed between surface-polished stainless steel plates, placed in a hot press heated to 180° C., and pressure-molded therein while applying a pressing force of 1 ton/cm² thereto, thereby producing a colored resin plate having a thickness of 1 mm. The obtained colored resin plate had a linear absorption of 0.0853 $\mu m^{-1}$ and a dispersing condition of 4.
<Fine Goethite Particles 1 to 5>

As fine goethite particles as a starting material, there were prepared fine goethite particles 1 to 5 as shown in Table 1.

Incidentally, fine goethite particles containing aluminum inside thereof were produced by using aluminum compounds shown in Table 1.
<Fine Goethite Particles 6 to 13 and Fine Hematite Particles 1>

The same heat-treating procedure as defined in Example 1 was conducted except that kind of fine goethite particles to be treated, heat-treating temperature and heat-treating time were changed variously.

The main production conditions and various properties of the obtained heat-treated fine goethite particles and fine hematite particles are shown in Table 2.

Examples 5 to 10

The same procedure as defined in Example 1 was conducted except that kind of the fine goethite particles to be heat-treated, heat-dehydration temperature and heat-dehydration time were changed variously, thereby obtaining a fine red iron oxide pigment.

The main production conditions and various properties of the obtained fine red iron oxide pigment are shown in Table 3.

Comparative Example 1

The same procedure as defined in Example 1 was conducted except that the fine goethite particles 1 were heat-dehydrated at 370° C. for 60 minutes without the preceding heat-treatment of the fine goethite particles, thereby obtaining a red iron oxide pigment.

The production conditions and various properties of the obtained red iron oxide pigment are shown in Table 3.

Comparative Example 2

The same procedure as defined in Example 1 was conducted except that the fine goethite particles 12 were heat-treated at 80° C. for 60 minutes, and then heat-dehydrated at 340° C. for 45 minutes.

The production conditions and various properties of the obtained red iron oxide pigment are shown in Table 3.

Comparative Example 3

The same procedure as defined in Example 1 was conducted except that the fine goethite particles were successively heat-dehydrated at 310° C. for 60 minutes and then at 340° C. for 45 minutes without the preceding heat-treatment of the fine goethite particles.

The production conditions and various properties of the obtained red iron oxide pigment are shown in Table 3.

Comparative Example 4

The same procedure as defined in Example 1 was conducted except that the fine goethite particles 13 were heat-treated at 180C for 30 minutes, and then heat-dehydrated at 680° C. for 60 minutes.

The production conditions and various properties of the obtained red iron oxide pigment are shown in Table 3.

Comparative Example 5
(Red Iron Oxide Pigment Obtained by the Method Described in Example 1 of Japanese Patent Application Laid-Open (KOKAI) No. 49-34498(1974))

4.1 liters of a 6.49 N-sodium hydroxide solution was added to 10 liters of a 1.3 mol-ferrous sulfate solution. The obtained solution was further mixed with water, thereby obtaining a mixed solution having a total volume of 27.5 liters. While minimizing the amount of oxygen admixed into the solution and while stirring, the obtained mixed solution was maintained at 33° C. and subjected to the production reaction of ferrous hydroxide for 10 minutes. Thereafter, while minimizing the amount of oxygen admixed into the solution and while stirring, the obtained ferrous hydroxide colloid solution was mixed with 22.5 liters of a 0.63 mol-ammonium bicarbonate solution, thereby obtaining a solution having a total volume of 50 liters. The obtained solution was maintained at 33° C. and subjected to the production reaction of ferrous carbonate for 30 minutes. The obtained ferrous carbonate colloid solution was maintained at 33° C., and air was passed therethrough at a feed rate of 140 liters per minute. After air was passed through the ferrous carbonate colloid solution for 50 minutes, a precipitate composed of yellow iron oxide hydroxide particles was obtained from the solution. The obtained precipitate of yellow iron oxide hydroxide particles were washed with water, filtered out and then dried at 100° C., thereby obtaining yellow iron oxide hydroxide particles.

The obtained yellow iron oxide hydroxide particles were spindle-shaped particles, and had an average major axial diameter of 0.01 µm, a geometrical standard deviation value of major axial diameter of 1.81, an average minor axial diameter of 0.0033 µm, a geometrical standard deviation value of minor axial diameter of 1.55, an aspect ratio of 3.0:1 and a BET specific surface area value of 256.1 m$^2$/g.

Next, the yellow iron oxide hydroxide particles was allowed to stand in air at 300° C. for 60 minutes, thereby obtaining red iron oxide particles.

Various properties of the obtained red iron oxide particles are shown in Table 3.

Comparative Example 6
(Red Iron Oxide Particles Obtained by the Method Described in Example 1 of Japanese Patent Publication (KOKOKU) No. 59-48768(1984))

6.8 liters of a 0.56 mol-sodium carbonate solution was charged into a cylindrical reactor. While blowing a nitrogen gas into the reactor, 5.2 liters of a 0.69 mol-ferrous sulfate solution was gradually added thereinto. The obtained ferrous carbonate-containing suspension had a pH value of 8.3. The suspension was stirred at room temperature for 2 hours while blowing a nitrogen gas thereinto. Thereafter, the nitrogen gas was replaced with air, and the air was passed through the suspension at a feed rate of 5.0 liters per minute. After air was passed through the suspension for 25 minutes, the oxidation reaction was completed, thereby obtaining a precipitate composed of yellow iron oxide hydroxide particles. The obtained precipitate was washed with water, filtered out and then dried at 100° C., thereby obtaining yellow iron oxide hydroxide particles.

The obtained yellow iron oxide hydroxide particles had an average major axial diameter of 0.038 µm, a geometrical standard deviation value of major axial diameter of 1.70, an average minor axial diameter of 0.0095 µm, a geometrical standard deviation value of minor axial diameter of 1.48, an aspect ratio of 4.0:1 and a BET specific surface area value of 216.5 m$^2$/g.

Next, the obtained yellow iron oxide hydroxide particles was allowed to stand in air at 280° C. for 180 minutes, thereby obtaining red iron oxide particles.

Various properties of the obtained red iron oxide particles are shown in Table 3.

Example 11

450 g of the fine red iron oxide pigment obtained in Example 5 was deaggregated in 10 liters of pure water using a stirrer, and further passed though a Homomic Line Mill (manufactured by Tokushu Kika Kogyo Co., Ltd.) three times, thereby obtaining a slurry containing the fine red iron oxide particles.

The concentration of the obtained slurry containing the fine red iron oxide particles was adjusted to 45 g/liter, and 10 liters of the slurry was sampled. The slurry was heated to 60° C. while stirring, and the pH value of the slurry was adjusted to 4.0.

Next, 167 ml of a 1 mol/liter-aluminum acetate solution (equivalent to 1.0% by weight (calculated as Al) based on the weight of the fine red iron oxide particles) was added to the slurry, and then the slurry was allowed to stand for 30 minutes. Thereafter, the pH value of the slurry was adjusted to 7.0 by adding an aqueous sodium hydroxide solution thereto, and the slurry was further allowed to stand for 30 minutes. Next, the slurry was successively subjected to filtration, washing with water, drying and pulverization, thereby obtaining a fine red iron oxide pigment whose particle surface was coated with a hydroxide of Al.

Examples 12 to 16

The same procedure as defined in Example 11 was conducted except that kind of the fine red iron oxide pigment, kind of the surface-coating material, pH value before adding the Al and/or Si compounds, amounts of the Al and/or Si compounds added and final pH value were changed variously, thereby obtaining a fine red iron oxide pigment whose particle surface was coated with the surface-coating material.

The main production conditions are shown in Table 4 and various properties of the obtained fine red iron oxide pigment are shown in Table 5.

Examples 17 to 28
<Paint Using Fine Red Iron Oxide Pigment>

The same procedure as defined in Example 2 was conducted except that kind of the fine red iron oxide pigment was changed variously, thereby obtaining a paint.

The main production conditions and various properties of the obtained paint are shown in Table 6.

Comparative Examples 7 to 12

The same procedure as defined in Example 2 was conducted except that kind of the fine red iron oxide pigment was changed variously, thereby obtaining a paint.

The main production conditions and various properties of the obtained paint are shown in Table 7.

Examples 29 to 40
<Resin Composition Using Fine Red Iron Oxide Pigment>

The same procedure as defined in Example 4 was conducted except that kind of the fine red iron oxide pigment was changed variously, thereby obtaining a resin composition.

The main production conditions and various properties of the obtained resin composition are shown in Table 8.

Comparative Examples 13 to 18

The same procedure as defined in Example 4 was conducted except that kind of the red iron oxide particles was changed variously, thereby obtaining a resin composition.

The main production conditions and various properties of the obtained resin composition are shown in Table 9.

TABLE 1

| Kind of starting particles | Production of fine goethite particles Kind of aluminum compound added | Properties of fine goethite particles | | |
|---|---|---|---|---|
| | | Shape | Average major axial diameter ($\mu$m) | Geometrical standard deviation of major axial diameter (–) |
| Fine goethite particles 1 | — | Spindle-shaped | 0.0472 | 1.55 |
| Fine goethite particles 2 | Aluminum sulfate | Spindle-shaped | 0.0571 | 1.55 |
| Fine goethite particles 3 | Aluminum sulfate | Acicular | 0.0758 | 1.56 |
| Fine goethite particles 4 | Aluminum acetate | Acicular | 0.0312 | 1.52 |
| Fine goethite particles 5 | Sodium aluminate | Acicular | 0.0916 | 1.61 |

| Kind of starting particles | Properties of fine goethite particles | | |
|---|---|---|---|
| | Average minor axial diameter ($\mu$m) | Geometrical standard deviation of minor axial diameter (–) | Aspect ratio (–) |
| Fine goethite particles 1 | 0.0089 | 1.31 | 5.3:1 |
| Fine goethite particles 2 | 0.0093 | 1.33 | 6.1:1 |
| Fine goethite particles 3 | 0.0114 | 1.32 | 6.6:1 |
| Fine goethite particles 4 | 0.0063 | 1.35 | 5.0:1 |
| Fine goethite particles 5 | 0.0201 | 1.38 | 4.6:1 |

| Kind of starting particles | Properties of fine goethite particles | |
|---|---|---|
| | BET specific surface area (m$^2$/g) | Al content (wt. %) |
| Fine goethite particles 1 | 175.5 | — |
| Fine goethite particles 2 | 192.1 | 2.56 |

TABLE 1-continued

| | | |
|---|---|---|
| Fine goethite particles 3 | 158.2 | 1.87 |
| Fine goethite particles 4 | 221.8 | 0.63 |
| Fine goethite particles 5 | 82.6 | 9.64 |

TABLE 2

| Kind of particles to be treated | Kind of starting particles | Conditions of heat-treatment | | |
|---|---|---|---|---|
| | | Atmosphere | Temperature (° C.) | Time (min) |
| Fine goethite particles 6 | Fine goethite particles obtained in Example 1 | air | 180 | 30 |
| Fine goethite particles 7 | Fine goethite particles 1 | air | 150 | 30 |
| Fine goethite particles 8 | Fine goethite particles 2 | air | 170 | 30 |
| Fine goethite particles 9 | Fine goethite particles 3 | air | 150 | 60 |
| Fine goethite particles 10 | Fine goethite particles 4 | air | 150 | 60 |
| Fine goethite particles 11 | Fine goethite particles 5 | air | 190 | 30 |
| Fine goethite particles 12 | Fine goethite particles 1 | air | 80 | 60 |
| Fine hematite particles 1 | Fine goethite particles 1 | air | 310 | 60 |
| Fine goethite particles 13 | Fine goethite particles 1 | air | 180 | 30 |

| Kind of particles to be treated | Properties of heat-treated fine goethite particles | |
|---|---|---|
| | Average major axial diameter ($\mu$m) | Geometrical standard deviation of major axial diameter (–) |
| Fine goethite particles 6 | 0.0689 | 1.33 |
| Fine goethite particles 7 | 0.0471 | 1.35 |
| Fine goethite particles 8 | 0.0572 | 1.36 |
| Fine goethite particles 9 | 0.0757 | 1.36 |
| Fine goethite particles 10 | 0.0313 | 1.32 |
| Fine goethite particles 11 | 0.0917 | 1.40 |
| Fine goethite particles 12 | 0.0472 | 1.55 |
| Fine hematite particles 1 | 0.0425 | 1.65 |
| Fine goethite particles 13 | 0.0471 | 1.35 |

TABLE 2-continued

Properties of heat-treated fine goethite particles

| Kind of particles to be treated | Average minor axial diameter (μm) | Geometrical standard deviation of minor axial diameter (-) | Aspect ratio (-) |
|---|---|---|---|
| Fine goethite particles 6 | 0.0101 | 1.15 | 6.8:1 |
| Fine goethite particles 7 | 0.0090 | 1.18 | 5.2:1 |
| Fine goethite particles 8 | 0.0094 | 1.13 | 6.1:1 |
| Fine goethite particles 9 | 0.0116 | 1.12 | 6.5:1 |
| Fine goethite particles 10 | 0.0065 | 1.10 | 4.8:1 |
| Fine goethite particles 11 | 0.0202 | 1.16 | 4.5:1 |
| Fine goethite particles 12 | 0.0089 | 1.31 | 5.3:1 |
| Fine hematite particles 1 | 0.0121 | 1.38 | 3.5:1 |
| Fine goethite particles 13 | 0.0089 | 1.19 | 5.3:1 |

| Kind of particles to be treated | Properties of heat-treated fine goethite particles | |
|---|---|---|
| | BET specific surface area (m²/g) | Al content (wt. %) |
| Fine goethite particles 6 | 168.1 | — |
| Fine goethite particles 7 | 178.5 | — |
| Fine goethite particles 8 | 189.7 | 2.56 |
| Fine goethite particles 9 | 153.1 | 1.88 |
| Fine goethite particles 10 | 216.9 | 0.63 |
| Fine goethite particles 11 | 83.0 | 9.65 |
| Fine goethite particles 12 | 176.9 | — |
| Fine hematite particles 1 | 131.6 | — |
| Fine goethite particles 13 | 175.9 | — |

TABLE 3

| Examples and Comparative Examples | Kind of particles to be treated | Conditions of heat-dehydration treatment | | |
|---|---|---|---|---|
| | | Atmosphere | Temp. (° C.) | Time (min) |
| Example 5 | Fine goethite particles 6 | air | 340 | 30 |
| Example 6 | Fine goethite particles 7 | air | 320 | 30 |
| Example 7 | Fine goethite particles 8 | air | 370 | 20 |
| Example 8 | Fine goethite particles 9 | air | 310 | 60 |
| Example 9 | Fine goethite particles 10 | air | 300 | 45 |
| Example 10 | Fine goethite particles 11 | air | 320 | 60 |
| Comparative Example 1 | Fine goethite particles 1 | air | 370 | 60 |
| Comparative Example 2 | Fine goethite particles 12 | air | 340 | 45 |
| Comparative Example 3 | Fine hematite particles 1 | air | 340 | 45 |
| Comparative Example 4 | Fine goethite particles 13 | air | 680 | 60 |
| Comparative Example 5 | — | air | 300 | 60 |
| Comparative Example 6 | — | air | 280 | 180 |

| Examples and Comparative Examples | Properties of fine red iron oxide pigment | |
|---|---|---|
| | Average major axial diameter (μm) | Geometrical standard deviation of major axial diameter (-) |
| Example 5 | 0.0632 | 1.33 |
| Example 6 | 0.0428 | 1.35 |
| Example 7 | 0.0513 | 1.36 |
| Example 8 | 0.0690 | 1.36 |
| Example 9 | 0.0281 | 1.33 |
| Example 10 | 0.0823 | 1.42 |
| Comparative Example 1 | 0.0421 | 1.66 |
| Comparative Example 2 | 0.0418 | 1.56 |
| Comparative Example 3 | 0.0406 | 1.65 |
| Comparative Example 4 | 0.0498 | 1.42 |
| Comparative Example 5 | 0.0100 | 1.83 |
| Comparative Example 6 | 0.0360 | 1.72 |

| Examples and Comparative Examples | Properties of fine red iron oxide pigment | | |
|---|---|---|---|
| | Average minor axial diameter (μm) | Geometrical standard deviation of minor axial diameter (-) | Aspect ratio (-) |
| Example 5 | 0.0099 | 1.15 | 6.4:1 |
| Example 6 | 0.0090 | 1.18 | 4.8:1 |
| Example 7 | 0.0087 | 1.13 | 5.9:1 |
| Example 8 | 0.0113 | 1.12 | 6.1:1 |
| Example 9 | 0.0067 | 1.10 | 4.2:1 |
| Example 10 | 0.0191 | 1.16 | 4.3:1 |
| Comparative Example 1 | 0.0092 | 1.32 | 4.6:1 |
| Comparative Example 2 | 0.0091 | 1.34 | 4.6:1 |
| Comparative Example 3 | 0.0121 | 1.33 | 3.4:1 |
| Comparative Example 4 | 0.0211 | 1.31 | 2.4:1 |
| Comparative Example 5 | 0.0038 | 1.55 | 2.6:1 |
| Comparative Example 6 | 0.0101 | 1.48 | 3.6:1 |

| Examples and Comparative Examples | Properties of fine red iron oxide pigment | |
|---|---|---|
| | BET specific surface area (m²/g) | Al content (wt. %) |
| Example 5 | 154.9 | — |
| Example 6 | 130.6 | — |
| Example 7 | 132.0 | 2.82 |
| Example 8 | 164.1 | 2.08 |
| Example 9 | 222.2 | 0.70 |
| Example 10 | 96.5 | 10.56 |
| Comparative Example 1 | 123.4 | — |

TABLE 3-continued

| | | |
|---|---|---|
| Comparative Example 2 | 151.3 | — |
| Comparative Example 3 | 131.6 | — |
| Comparative Example 4 | 54.5 | — |
| Comparative Example 5 | 231.6 | — |
| Comparative Example 6 | 196.8 | — |

TABLE 4

| Examples | Kind of fine red iron oxide pigment (Example No.) | Concentration of water suspension (g/liter) | Coating with aluminum and/or silicon compound pH value before addition of Al and/or Si compound (−) |
|---|---|---|---|
| Example 11 | Example 5 | 45 | 4.0 |
| Example 12 | Example 6 | 45 | 10.0 |
| Example 13 | Example 7 | 45 | 4.0 |
| Example 14 | Example 8 | 45 | 10.3 |
| Example 15 | Example 9 | 45 | 3.8 |
| Example 16 | Example 10 | 45 | 10.5 |

| | Coating with aluminum and/or silicon compound | | |
|---|---|---|---|
| | Aluminum and/or silicon compound | | |
| Examples | Kind of Al and/or Si compound added | Amount of Al or Si compound added (calculated as Al and/or SiO$_2$) (wt. %) | Final pH value (−) |
| Example 11 | Aluminum acetate | 1.0 | 7.0 |
| Example 12 | Water glass #3 | 2.0 | 7.0 |
| Example 13 | Aluminum/sulfate | 3.8 | 7.5 |
| Example 14 | Sodium aluminate | 9.5 | 6.5 |
| Example 15 | Colloidal silica | 5.5 | 6.8 |
| Example 16 | Sodium aluminate | 5.0 | 7.0 |
| | Water glass #3 | 2.0 | |

TABLE 5

Properties of fine red iron oxide pigment coated with hydroxide of aluminum and/or oxide of silicon

| Examples | Average major axial diameter (μm) | Geometrical standard deviation of major axial diameter (−) | Average minor axial diameter (μm) | Geometrical standard deviation of minor axial diameter (−) |
|---|---|---|---|---|
| Example 11 | 0.0632 | 1.33 | 0.0100 | 1.15 |
| Example 12 | 0.0428 | 1.35 | 0.0091 | 1.18 |
| Example 13 | 0.0512 | 1.37 | 0.0087 | 1.13 |
| Example 14 | 0.0691 | 1.35 | 0.0115 | 1.12 |
| Example 15 | 0.0280 | 1.32 | 0.0067 | 1.10 |
| Example 16 | 0.0823 | 1.41 | 0.0191 | 1.41 |

TABLE 5-continued

Properties of fine red iron oxide pigment coated with hydroxide of aluminum and/or oxide of silicon

| Examples | Aspect ratio (−) | BET specific surface area (m$^2$/g) | Al content (wt. %) |
|---|---|---|---|
| Example 11 | 6.3:1 | 150.4 | — |
| Example 12 | 4.7:1 | 135.3 | — |
| Example 13 | 5.9:1 | 128.6 | 2.82 |
| Example 14 | 6.0:1 | 171.1 | 2.08 |
| Example 15 | 4.2:1 | 202.6 | 0.70 |
| Example 16 | 4.3:1 | 23.6 | 10.56 |

Properties of fine red iron oxide pigment coated with hydroxide of aluminum and/or oxide of silicon

| Examples | Amount of hydroxide of aluminum covered (calculated as Al) (wt. %) | Amount of oxide of silicon covered (calculated as SiO$_2$) (wt. %) |
|---|---|---|
| Example 11 | 0.99 | — |
| Example 12 | — | 1.93 |
| Example 13 | 3.66 | — |
| Example 14 | 8.69 | — |
| Example 15 | — | 4.89 |
| Example 16 | 4.66 | 1.83 |

TABLE 6

Production of paint

| Examples | Kinds of fine red iron oxide pigment (Example No.) | Kinds of resins | Properties of paint Viscosity (cP) |
|---|---|---|---|
| Example 17 | Example 5 | Amino-alkyd resin | 2,124 |
| Example 18 | Example 6 | Amino-alkyd resin | 2,304 |
| Example 19 | Example 7 | Amino-alkyd resin | 2,099 |
| Example 20 | Example 8 | Amino-alkyd resin | 1,792 |
| Example 21 | Example 9 | Amino-alkyd resin | 2,560 |
| Example 22 | Example 10 | Amino-alkyd resin | 1,690 |
| Example 23 | Example 11 | Amino-alkyd resin | 1,920 |
| Example 24 | Example 12 | Amino-alkyd resin | 1,536 |
| Example 25 | Example 13 | Amino-alkyd resin | 1,766 |
| Example 26 | Example 14 | Amino-alkyd resin | 1,612 |
| Example 27 | Example 15 | Amino-alkyd resin | 2,099 |
| Example 28 | Example 16 | Amino-alkyd resin | 1,894 |

Properties of coating film

| Examples | 20° Gloss (%) | Transparency of coating film (linear coefficient absorption) (μm$^{-1}$) |
|---|---|---|
| Example 17 | 101 | 0.0648 |
| Example 18 | 99 | 0.0711 |
| Example 19 | 112 | 0.0732 |
| Example 20 | 105 | 0.0832 |

TABLE 6-continued

| Example 21 | 118 | 0.0468 |
| Example 22 | 98  | 0.0768 |
| Example 23 | 111 | 0.0526 |
| Example 24 | 109 | 0.0654 |
| Example 25 | 118 | 0.0666 |
| Example 26 | 106 | 0.0762 |
| Example 27 | 121 | 0.0312 |
| Example 28 | 96  | 0.0619 |

TABLE 7

Production of paint

| Comparative Examples | Kinds of red iron oxide pigment (Comparative Example No.) | Kinds of resins | Properties of paint Viscosity (cP) |
|---|---|---|---|
| Comparative Example 7  | Comparative Example 1 | Amino-alkyd resin | 2,304 |
| Comparative Example 8  | Comparative Example 2 | Amino-alkyd resin | 2,560 |
| Comparative Example 9  | Comparative Example 3 | Amino-alkyd resin | 2,688 |
| Comparative Example 10 | Comparative Example 4 | Amino-alkyd resin | 2,432 |
| Comparative Example 11 | Comparative Example 5 | Amino-alkyd resin | 5,632 |
| Comparative Example 12 | Comparative Example 6 | Amino-alkyd resin | 4,096 |

Properties of coating film

| Comparative Examples | 20° Gloss (%) | Transparency of coating film (linear absorption) ($\mu m^{-1}$) |
|---|---|---|
| Comparative Example 7  | 76 | 0.1632 |
| Comparative Example 8  | 68 | 0.1783 |
| Comparative Example 9  | 76 | 0.1826 |
| Comparative Example 10 | 78 | 0.2120 |
| Comparative Example 11 | 65 | 0.1562 |
| Comparative Example 12 | 58 | 0.1936 |

TABLE 8

Production of resin composition
Fine red iron oxide pigment

| Examples | Kind (Example No.) | Amount (part by weight) |
|---|---|---|
| Example 29 | Example 5  | 1.0 |
| Example 30 | Example 6  | 1.0 |
| Example 31 | Example 7  | 1.0 |
| Example 32 | Example 8  | 1.0 |
| Example 33 | Example 9  | 1.0 |
| Example 34 | Example 10 | 1.0 |
| Example 35 | Example 11 | 1.0 |
| Example 36 | Example 12 | 1.0 |
| Example 37 | Example 13 | 1.0 |
| Example 38 | Example 14 | 1.0 |
| Example 39 | Example 15 | 1.0 |
| Example 40 | Example 16 | 1.0 |

TABLE 8-continued

Production of resin composition
Resin

| Examples | Kind | Amount (part by weight) |
|---|---|---|
| Example 29 | Polyvinyl chloride resin 103EP8D (produced by Nippon Zeon Co., Ltd.) | 99.0 |
| Example 30 | Polyvinyl chloride resin 103EP8D (produced by Nippon Zeon Co., Ltd.) | 99.0 |
| Example 31 | Polyvinyl chloride resin 103EP8D (produced by Nippon Zeon Co., Ltd.) | 99.0 |
| Example 32 | Polyvinyl chloride resin 103EP8D (produced by Nippon Zeon Co., Ltd.) | 99.0 |
| Example 33 | Polyvinyl chloride resin 103EP8D (produced by Nippon Zeon Co., Ltd.) | 99.0 |
| Example 34 | Polyvinyl chloride resin 103EP8D (produced by Nippon Zeon Co., Ltd.) | 99.0 |
| Example 35 | Polyvinyl chloride resin 103EP8D (produced by Nippon Zeon Co., Ltd.) | 99.0 |
| Example 36 | Polyvinyl chloride resin 103EP8D (produced by Nippon Zeon Co., Ltd.) | 99.0 |
| Example 37 | Polyvinyl chloride resin 103EP8D (produced by Nippon Zeon Co., Ltd.) | 99.0 |
| Example 38 | Polyvinyl chloride resin 103EP8D (produced by Nippon Zeon Co., Ltd.) | 99.0 |
| Example 39 | Polyvinyl chloride resin 103EP8D (produced by Nippon Zeon Co., Ltd.) | 99.0 |
| Example 40 | Polyvinyl chloride resin 103EP8D (produced by Nippon Zeon Co., Ltd.) | 99.0 |

Production of resin composition
Additive

| Examples | Kind | Amount (part by weight) | Kneading temperature (° C.) |
|---|---|---|---|
| Example 29 | Calcium stearate | 2.0 | 160 |
| Example 30 | Calcium stearate | 2.0 | 160 |
| Example 31 | Calcium stearate | 2.0 | 160 |
| Example 32 | Calcium stearate | 2.0 | 160 |
| Example 33 | Calcium stearate | 2.0 | 160 |
| Example 34 | Calcium stearate | 2.0 | 160 |
| Example 35 | Calcium stearate | 2.0 | 160 |
| Example 36 | Calcium stearate | 2.0 | 160 |
| Example 37 | Calcium stearate | 2.0 | 160 |
| Example 38 | Calcium stearate | 2.0 | 160 |
| Example 39 | Calcium stearate | 2.0 | 160 |
| Example 40 | Calcium stearate | 2.0 | 160 |

TABLE 8-continued

Properties of resin composition

| Examples | Dispersing condition (-) | Transparency of resin composition (linear coefficient absorption) ($\mu m^{-1}$) |
|---|---|---|
| Example 29 | 4 | 0.0823 |
| Example 30 | 3 | 0.0840 |
| Example 31 | 4 | 0.0912 |
| Example 32 | 4 | 0.0816 |
| Example 33 | 3 | 0.0800 |
| Example 34 | 5 | 0.0921 |
| Example 35 | 5 | 0.0832 |
| Example 36 | 5 | 0.0798 |
| Example 37 | 5 | 0.0816 |
| Example 38 | 4 | 0.0726 |
| Example 39 | 5 | 0.0658 |
| Example 40 | 5 | 0.0912 | properties of resin composition
Percentage of area of portion deteriorated and discolored when heated at 190° C.
$\{(S/S_0) \times 100\}$ (%)

| Examples | 30 min. | 60 min. | 90 min. |
|---|---|---|---|
| Example 29 | — | — | — |
| Example 30 | — | — | — |
| Example 31 | 0 | 0 | 5 |
| Example 32 | 0 | 5 | 5 |
| Example 33 | 0 | 5 | 10 |
| Example 34 | 0 | 0 | 5 |
| Example 35 | — | — | — |
| Example 36 | — | — | — |
| Example 37 | 0 | 0 | 0 |
| Example 38 | 0 | 0 | 5 |
| Example 39 | 0 | 0 | 5 |
| Example 40 | 0 | 0 | 0 |

TABLE 9

Production of resin composition
Red iron oxide pigment

| Comparative Examples | Kind (Comparative Example No.) | Amount (part by weight) |
|---|---|---|
| Comparative Example 13 | Comparative Example 1 | 1.0 |
| Comparative Example 14 | Comparative Example 2 | 1.0 |
| Comparative Example 15 | Comparative Example 3 | 1.0 |
| Comparative Example 16 | Comparative Example 4 | 1.0 |
| Comparative Example 17 | Comparative Example 5 | 1.0 |
| Comparative Example 18 | Comparative Example 6 | 1.0 |

Production of resin composition
Resin

| Comparative Examples | Kind | Amount (part by weight) |
|---|---|---|
| Comparative Example 13 | Polyvinyl chloride resin 103EP8D (produced by Nippon Zeon Co., Ltd.) | 99.0 |
| Comparative Example 14 | Polyvinyl chloride resin 103EP8D (produced by Nippon Zeon Co., Ltd.) | 99.0 |
| Comparative Example 15 | Polyvinyl chloride resin 103EP8D (produced by Nippon Zeon Co., Ltd.) | 99.0 |
| Comparative Example 16 | Polyvinyl chloride resin 103EP8D (produced by Nippon Zeon Co., Ltd.) | 99.0 |
| Comparative Example 17 | Polyvinyl chloride resin 103EP8D (produced by Nippon Zeon Co., Ltd.) | 99.0 |
| Comparative Example 18 | Polyvinyl chloride resin 103EP8D (produced by Nippon Zeon Co., Ltd.) | 99.0 |

Production of resin composition
Additive

| Comparative Examples | Kind | Amount (part by weight) | Kneading temperature (° C.) |
|---|---|---|---|
| Comparative Example 13 | Calcium stearate | 2.0 | 160 |
| Comparative Example 14 | Calcium stearate | 2.0 | 160 |
| Comparative Example 15 | Calcium stearate | 2.0 | 160 |
| Comparative Example 16 | Calcium stearate | 2.0 | 160 |
| Comparative Example 17 | Calcium stearate | 2.0 | 160 |
| Comparative Example 18 | Calcium stearate | 2.0 | 160 |

Properties of resin composition

| Comparative Examples | Dispersing condition (-) | Transparency of resin composition (linear coefficient absorption) ($\mu m^{-1}$) |
|---|---|---|
| Comparative Example 13 | 1 | 0.1683 |
| Comparative Example 14 | 2 | 0.1821 |
| Comparative Example 15 | 1 | 0.2023 |
| Comparative Example 16 | 1 | 0.2562 |
| Comparative Example 17 | 1 | 0.3652 |
| Comparative Example 18 | 1 | 0.2865 |

Properties of resin composition
Percentage of area of portion deteriorated and discolored when heated at 190° C.
$\{(S/S_0) \times 100\}$ (%)

| Comparative Examples | 30 min. | 60 min. | 90 min. |
|---|---|---|---|
| Comparative Example 13 | 10 | 20 | 50 |
| Comparative Example 14 | 20 | 40 | 85 |
| Comparative Example 15 | 15 | 25 | 60 |
| Comparative Example 16 | 20 | 45 | 40 |
| Comparative Example 17 | 20 | 40 | 60 |
| Comparative Example 18 | 15 | 30 | 70 |

What is claimed is:

1. A fine red iron oxide pigment comprising hematite particles and having a geometrical standard deviation of major axial diameter of not more than 1.5, a geometrical standard deviation of minor axial diameter of not more than 1.3 and an average major axial diameter of 0.005 to 0.1 $\mu$m.

2. A fine red iron oxide pigment according to claim 1, which further has an average minor axial diameter of 0.0025 to 0.05 μm, an aspect ratio (average major axial diameter/ average minor axial diameter) of not more than 20:1 and a BET specific surface area of 40 to 250 m$^2$/g.

3. A fine red iron oxide pigment according to claim 1, which further contains aluminum inside of each particle of said pigment in an amount of 0.05 to 50% by weight, calculated as Al, based on the weight of said pigment.

4. A fine red iron oxide pigment according to claim 1, which further has at least one surface-coating material selected from the group consisting of a hydroxide of aluminum, an oxide of aluminum, a hydroxide of silicon and an oxide of silicon, on at least a part of the surface of each said pigment particle.

5. A fine red iron oxide pigment according to claim 4, wherein the amount of said surface-coating material is 0.01 to 20% by weight, calculated as Al, SiO$_2$ or both Al and SiO$_2$, based on the weight of said pigment.

6. A fine red iron oxide pigment according to claim 1, which has a geometrical standard deviation of major axial diameter of 1.01 to 1.48, a geometrical standard deviation of minor axial diameter of 1.01 to 1.28 and an average major axial diameter of 0.01 to 0.09 μm.

7. A process for producing a fine red iron oxide pigment, comprising:
   (i) heat-treating fine goethite particles at a temperature of 100 to 200° C. to allow ultrafine goethite particles to be absorbed into said fine goethite particles; and
   (ii) then heat-dehydrating said fine goethite particles at a temperature of 250 to 500° C. to transform said fine goethite particles into fine hematite particles.

8. A process for producing a fine red iron oxide pigment, comprising:
   (i) heat-treating fine goethite particles containing aluminum inside thereof in an amount of 0.05 to 50% by weight, calculated as Al, based on the weight of the fine goethite particles, at a temperature of 100 to 200° C. to allow ultrafine goethite particles to be absorbed into said fine goethite particles; and
   (ii) then heat-dehydrating said fine goethite particles at a temperature of 250 to 500° C. to transform said fine goethite particles into fine hematite particles.

9. A paint comprising a paint base material and the fine red iron oxide pigment as defined in claim 1.

10. A paint according to claim 9, wherein the content of said pigment is 0.5 to 100 parts by weight based on 100 parts by weight of said paint base material.

11. A rubber or resin composition comprising a rubber or resin base material and the fine red iron oxide pigment as defined in claim 1.

12. A rubber or resin composition according to claim 11, wherein the content of said pigment is 0.01 to 50 parts by weight based on 100 parts by weight of said rubber or resin.

* * * * *